United States Patent
Meehan (10) Patent No.: US 8,639,095 B2
(45) Date of Patent: Jan. 28, 2014

(54) INTELLIGENT BROWSER FOR MEDIA EDITING APPLICATIONS

(75) Inventor: Kenneth Meehan, Redwood City, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 13/538,968

(22) Filed: Jun. 29, 2012

(65) Prior Publication Data

US 2014/0003795 A1     Jan. 2, 2014

(51) Int. Cl.
*H04N 5/93*      (2006.01)

(52) U.S. Cl.
USPC ........................................................ 386/278

(58) Field of Classification Search
USPC .......... 386/278, 280, 281, 282, 283, 286, 290
See application file for complete search history.

(56) References Cited

U.S. PATENT DOCUMENTS

| | | | |
|---|---|---|---|
| 2004/0100487 A1* | 5/2004 | Mori et al. | 345/724 |
| 2006/0008247 A1* | 1/2006 | Minami et al. | 386/52 |
| 2009/0142030 A1* | 6/2009 | Lee et al. | 386/52 |
| 2011/0026900 A1* | 2/2011 | Lussier et al. | 386/281 |

* cited by examiner

*Primary Examiner* — Tat Chio
(74) *Attorney, Agent, or Firm* — Schwegman Lundberg & Woessner, P.A.

(57) ABSTRACT

A browser in a media editing application enables a user to store a desired set of parameters for a given effect, and thereafter select the stored data and apply it to other media content, without the need to manually set the parameter values each time. In one embodiment, the user can manually save customized or frequently used effects in the browser, for subsequent selection and application to media content. In another embodiment, the browser can include functionality that analyzes previously created and stored projects, to identify repeatedly used effects. If an effect is identified that meets a certain frequency of use threshold, the browser can auto-populate itself with that effect, and its corresponding parameters, for subsequent selection and application to media content by the user.

19 Claims, 6 Drawing Sheets

| Name | Name |
|---|---|
| Icon | Img01325.bmp |
| Type | Filter |
| Amount | 100 |
| Hghlt | 0 |
| Color_H | 23.08 |
| Color_S | 68 |
| Color_B | 75 |

INTELLIGENT BROWSER FOR MEDIA EDITING APPLICATIONS

FIELD

The present disclosure generally relates to media editing tools, and more particularly to the users' ability to apply various effects to media content that is being edited.

BACKGROUND

Media editing application programs enable users to manipulate media files in a variety of different ways to create a desired result. For example, with a video editing application, the user can trim, splice, cut and arrange multiple video clips along a time line to create a sequence of scenes. As another feature, the user can add one or more audio tracks to the video being edited, to create a multi-media presentation. Analogous types of operations can be performed on audio files, photos, 3-D models, etc.

One of the tools commonly provided with media editing applications provides the ability to add effects to the content of a media file. For instance, a variety of different types of effects can be added to a video production. As examples, various video transitions can be applied to the clips that make up a presentation sequence, such as dissolves, cross-fades, wipes, and the like. In addition, different types of filters can be applied to the images that constitute the video, such as blur, color correction, distortion, timing, and the like. Typically, each effect may have one or more parameters that the user can adjust, to vary the impact of that effect. For instance, a color correction filter may have a number of sliders, or other adjustment controls, to enable the user to set desired values for different portions of a color chart, e.g., whites, mid-level colors and blacks, as well as saturation values. As another example, a contrast filter may enable the user to set values for different levels of contrast, pivot and mix.

Once a user has found a suitable set of parameter settings for effects in a clip, it may be desirable to apply those same effects, with the same parameter settings, to other clips. In some cases, it may be possible to employ a copy-and-paste operation to replicate the effect parameter settings from one clip to another clip. However, in such a situation, using a copy-and-paste operation for one effect may disturb the settings for other effects. Consequently, the user must be careful when applying an effect via a copy-and-paste operation, so as not to disturb the settings for other applied effects in the clip. To avoid such a result, it is often necessary for the user to manually set the parameter values for each effect that is applied to each clip, rather than use a copy-and-paste operation.

SUMMARY

In accordance with concepts disclosed herein, a browser within a media editing application enables a user to store a desired set of parameters for a given effect, and thereafter select the stored data and apply it to other media content, without the need to manually set the parameter values each time. In one embodiment, the user can manually save customized or frequently used effects in the browser, for subsequent selection and application to media content. In another embodiment, the browser can include functionality that analyzes previously created and stored media projects, to identify repeatedly used effects. If an effect is identified that meets a certain frequency of use threshold, the browser can automatically populate itself with that effect, and its corresponding parameters, for subsequent selection and application to media content by the user.

Further features of the browser, and the advantages provided thereby, are described hereinafter with reference to exemplary embodiments illustrated in the accompanying drawings.

DETAILED DESCRIPTION

To facilitate an understanding of the principles that underlie the invention, it is described hereinafter with reference to exemplary embodiments of its application to a video editing program. It will be appreciated that the practical implementations of the invention are not limited to the described examples. Rather, the concepts described herein can be applied in a variety of different types of media editing applications, such as photo editing programs, audio editing programs, music creating programs, 3-D modeling programs, etc.

Figure 1:
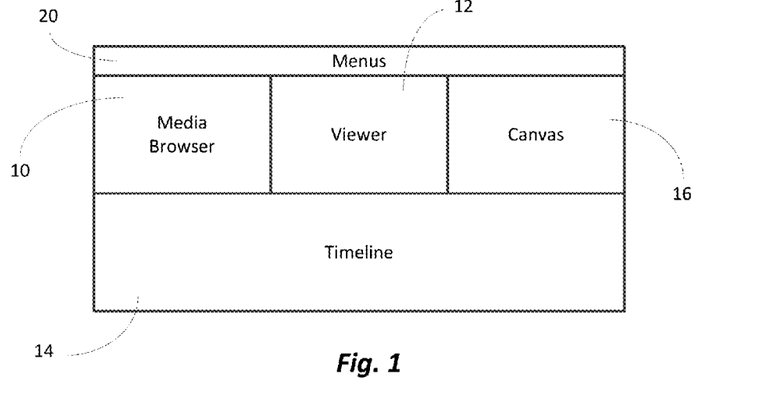
FIG. 1 is an illustration of an exemplary user interface for a video editing application, in which an effect browser can be implemented.

FIG. 1 illustrates an example of a user interface for a video editing application in which an effect browser can be implemented in accordance with the present disclosure. The interface includes a number of windows, including a media browser 10, a viewer 12, a timeline 14 and a canvas 16. The media browser 10 contains media clips 18 (FIG. 2) that are available to incorporate into a movie or other video sequence being edited. Typically, the clips shown in the browser may be those which the user has imported for a specific video editing project. However, they could be a complete inventory of video clips that are stored on the user's computer, or another accessible storage medium.

The viewer 12 displays a selected clip 18 from those presented in the browser 10. Editing operations on that clip are depicted in the viewer as the user makes changes to the clip, e.g. by adding effects to the content of the clip. The timeline 14 holds the sequences of video and audio clips, in the order in which the user has assembled them to create a video project. The timeline can also contain other items such as titles and transitions at designated points in the sequence. The canvas 16 is the area in which the movie created in the timeline 14 can be played back for viewing.

Figure 2:
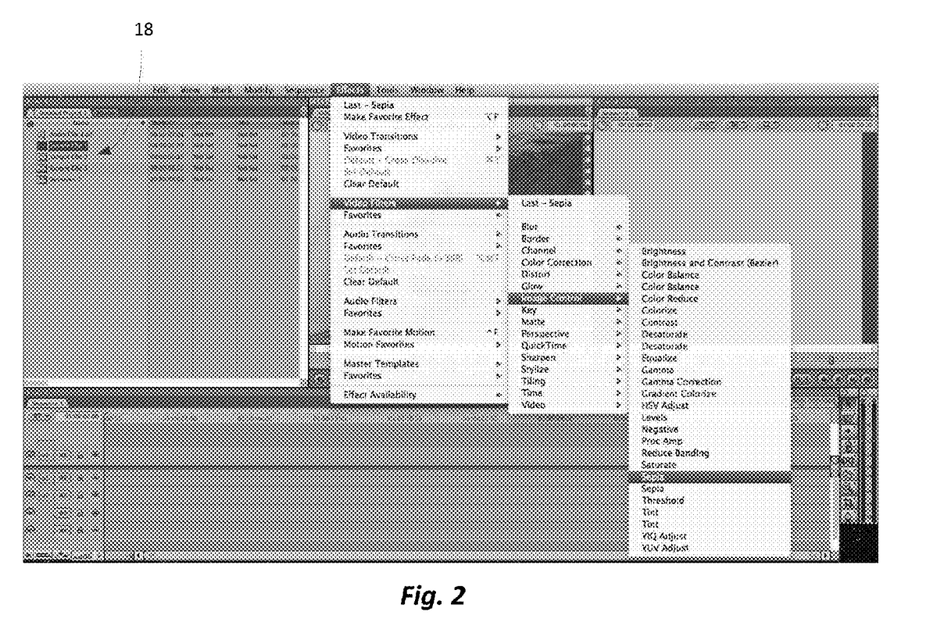
FIG. 2 is an illustration of an effect menu.

In addition to these main viewing windows, the video editing application provides a variety of tools that can be used to alter the content and timing of the clips that constitute the movie. These tools might be accessible via a menu bar 20 on the user interface, or within one or more of the individual windows. One such tool is a menu of effects that can be applied to individual clips and/or between clips. FIG. 2 illustrates an example of such a menu. Since a large number of effects may be available for use, they can be grouped into multiple submenus, as shown in the figure. In this particular example, the user has selected "Video Filters" in the main Effects menu, and "Image Control" in the first submenu, and then "Sepia" from the second submenu, to apply a sepia tint to the images of a selected clip.

Figure 3:
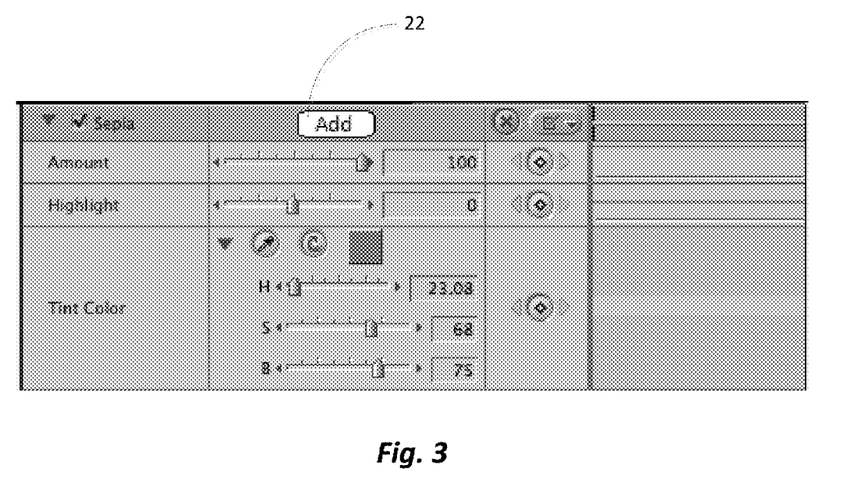
FIG. 3 is an illustration of an input box for adjusting effect parameter values.

Once a particular effect has been selected and applied to a clip, the user can adjust various parameters which apply to that effect. FIG. 3 illustrates an example of a parameter-setting input box that the user can employ to adjust the settings of the applied effect. In the case of the sepia filter, the user has the ability to adjust the amount to which the setting is applied to the content of the clip, e.g. the percentage of the tint color to apply relative to the original colors of the clip. The user can also adjust the highlight parameter to lighten or darken the effect, as well as pick the color for the effect.

Each time the user applies an effect to a clip, the effect will normally be applied with default parameter values for each of its settings. If the user desires to change those settings, it is necessary to manually alter them, for example by using an input box of the type shown in FIG. 3. It may be possible for the user to change the default values, so that a preferred set of parameter values is automatically invoked each time a given effect is applied to a clip. However, it may not be the case that the user desires to employ those same parameter values in all situations. For instance, in action clips, the user may desire to employ a high degree of contrast when the Contrast effect is applied, but for clips that are principally landscape scenes, it might be preferable to set the contrast to a lower value for that same effect. Thus, the ability to adjust default parameter values may not significantly reduce the need to manually adjust parameter values during a video editing project.

To address this need, a browser is provided that saves instances of effects with frequently used parameter settings, so that the user can apply those effects, with those settings, without having to manually adjust the parameter values each time the effect is applied. In one embodiment, the effect instances are stored in the same browser 10 as the media clips 18, so that the user can select the media content, and the effects to be applied to that content, from the same area in the user interface.

Figure 4:
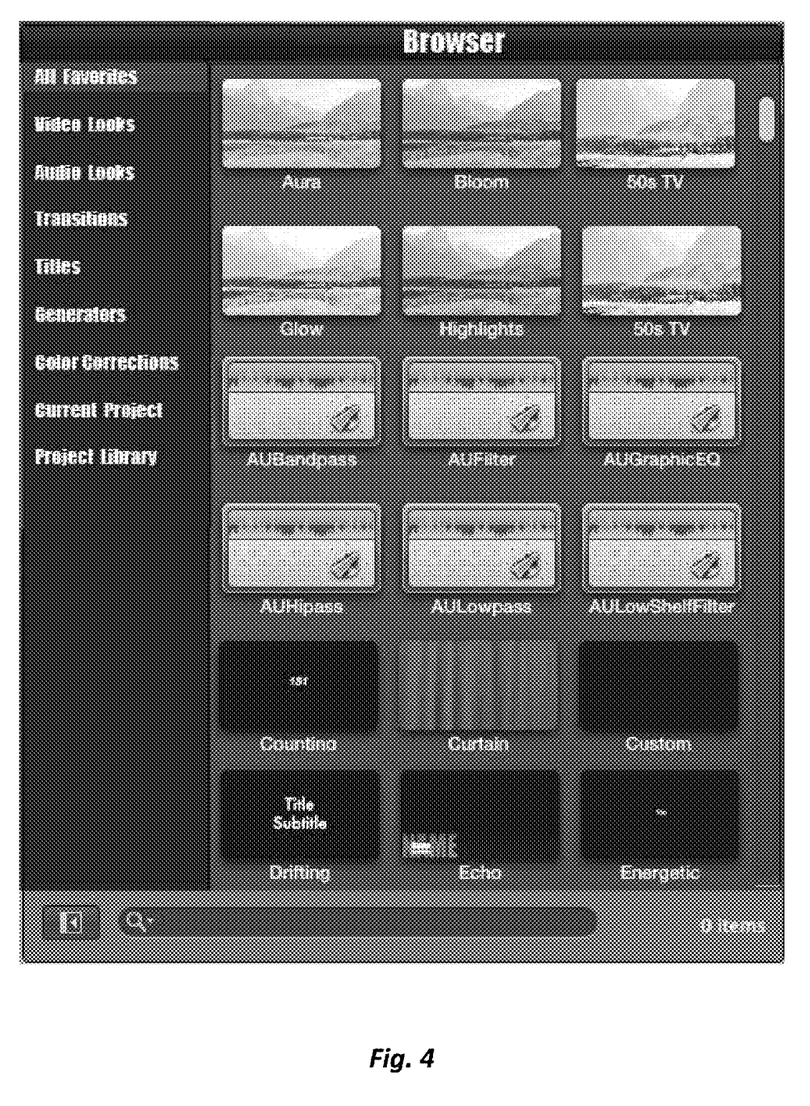
FIG. 4 is an enlarged view of an effect browser.

One example of such a browser is illustrated in FIG. 4. Referring thereto, the browser presents a number of items of information, at least some of which pertain to effects that a user has applied to video clips. In the illustrated example, all of the items of information pertain to effects. In practice, however, the browser could also contain video and audio clips. In other words, the items of information pertaining to effects can be presented in the media browser 10 illustrated in the user interface of FIG. 1. Each item presented in the browser comprises an icon, or thumbnail image, and a title. For items that pertain to effects, the title comprises the name of the effect to which that item applies.

Figure 5:
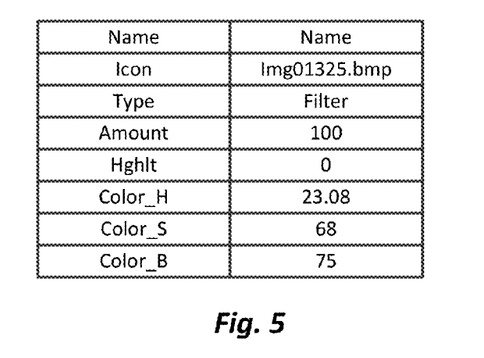
FIG. 5 is a diagram of an exemplary data structure for storing effect parameter settings.

FIG. 5 illustrates an example of a data structure that can be used to store the information associated with each effect item on the browser. The illustrated example pertains to the sepia effect referenced in FIGS. 2 and 3. The first two data items comprise the name of the effect and the identification of the icon, or thumbnail, that is displayed with that name in the browser. The next item pertains to the type of effect, in this case a filter. The remaining data items comprise the individual parameters associated with that effect and the user-set values for each of those parameters. In operation, the user can select one of the effect items from the browser, for example by clicking on it with a cursor, or tapping it in a touch screen environment. Upon doing so, its associated data structure, of the type illustrated in FIG. 5, is accessed. The parameter values stored in the data structure are retrieved, and the effect is applied to a clip that is displayed in the viewer window 12, with those parameter settings.

The data structure can be stored in a suitable file format, e.g., an XML file, that enables it to be exported to a portable storage medium, and/or transmitted over a network, so that it can be employed with a different instantiation of the video editing program.

Figure 6:
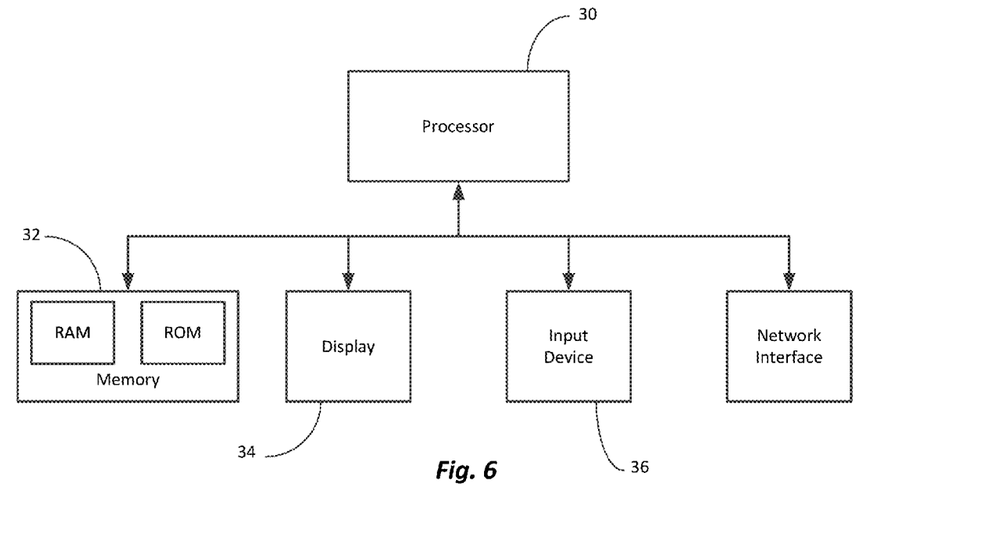
FIG. 6 is a general block diagram of the structure of a computing device in which the user interface can be implemented.

FIG. 6 is a block diagram of the general structure of a computing device in which a video editing application having a browser can be implemented, in accordance with the present disclosure. The computing device includes a processor 30 operatively connected to one or more forms of computer-readable storage media 32, e.g. RAM, ROM, flash memory, optical and/or magnetic disk drives, etc. The storage media can be integral with the computing device, attachable to the computing device, e.g., a flash drive, or accessible via a wired or wireless network. The processor is also connected to a display device 34 and an input device 36 in some forms of computing devices, the display device and the input device could be integrated, e.g., a touch screen, whereas in other they may be separate components, e.g., a monitor, a keyboard and a mouse.

The program instructions to implement the browser described herein are preferably stored in a non-volatile form of memory, such as ROM, flash drive, disk drive, etc., and loaded into RAM for execution. The video and audio clips 18 that are imported into the media browser 10, for use in the creation of a video production, as well as the project file that contains the end result of the editing project, can be stored in the same non-volatile memory as the video editing application program, or in separate memory that is accessible via the computing device.

Effect items can be stored in the browser in two alternative manners. First, the user may have the option to manually add an effect, with desired parameter settings, to the browser. For instance, referring to the effect setting input box illustrated in FIG. 3, after the user has adjusted the settings, and confirmed that these settings are desirable, he or she can activate an "Add" button 22 in the input box, to include the effect, with those settings, in the browser. In response thereto, the processor of the computing device generates a file, such as that illustrated in FIG. 5, and stores it at an appropriate location in memory. The processor also causes the newly added effect to be displayed in the browser with its designated icon and name.

As a further feature, the browser may have the ability to automatically search and analyze the files of previously created video projects, to identify effects with parameter settings that are regularly employed. The file for a project contains all of the information necessary to render the video sequence, including the settings for each of the effects that are employed in the sequence. The browser can analyze the files to identify each effect in a file, and the settings that are employed with each effect. If a certain set of parameter settings for a given effect appears a number of times in a project file, or across multiple project files, that effect and its corresponding settings can be identified as a frequently-used effect, and automatically stored in the browser. For example, as the browser scans each project file, it can record each effect that is employed in the project, as well as each set of parameter settings that are used for that effect. A counter can be associated with each recorded set of parameter settings, and incremented each time the same set of parameter settings is encountered in the scanning of one of more project files. If the counter reaches a predetermined threshold value, the effect, with those settings, is determined to be a frequently-used effect. In that case, a data file for the effect, for example of the type shown in FIG. 5, is generated, and the effect is added to the browser.

Figure 7:
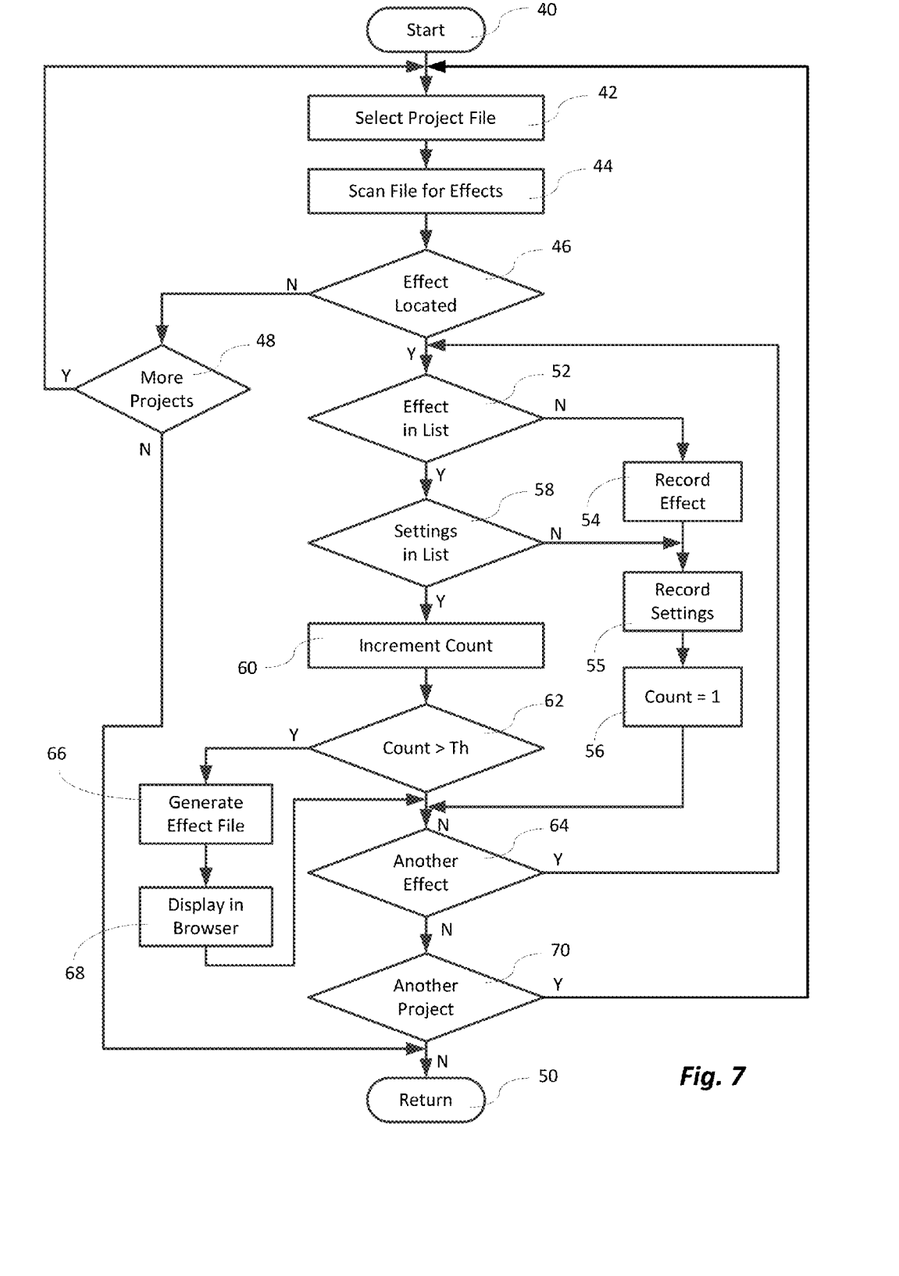
FIG. 7 is a flowchart of a procedure for automatically populating the browser.

FIG. 7 is a flowchart illustrating one example of an algorithm for implementing this functionality. In response to a user command, or upon the occurrence of an event such as saving a new project file, the algorithm is initiated at step 40. At step 42 a project file is selected, for example from a designated storage area, and scanned at step 44 to identify effects contained therein. A determination is made at step 46 whether at least one effect has been located. If no effects are located in the selected file, a determination is made at step 48 whether there are any more project files to be analyzed in the designated area. If so, the process returns to step 42 to select the next file. If not, the process ends at step 50, and the processor returns to its main routine.

If an effect is located at step 46, a determination is made at step 52 whether that particular effect is already stored in a list of effects that have been previously identified during the execution of the algorithm. Initially, no effects will be contained on the list, and so the process proceeds to steps 54 and 55 to record the effect on the list, and to record the particular parameter settings for the located effect. A count value for those effect settings is set to an initial value of one at step 56.

If, at step 52, the effect is found on the list, a determination is made at step 58 whether the parameter settings for the identified effect are also recorded in the list. For instance, it may be the case that the same effect was previously located in a project file, but with a different set of parameters. In that case, if the currently identified set of parameters is not already on the list for that effect, the process proceeds to step 54 to record those settings on the list in association with the located effect, and sets the count for that set of parameters to a value of one at step 56. Thus, any given effect can have multiple sets of parameter settings recorded on the list, with a separate count value for each set.

At step 58, if the settings for the located effected are already recorded on the list, then the count value for those settings is incremented at step 60. A determination is made at step 62 whether the count value exceeds a predetermined threshold value Th. If not, the process determines at step 64 whether there is another effect to be evaluated in the project file that is currently being scanned. If so, it returns to step 52 to repeat the foregoing process.

If, at step 62, it is determined that the count value exceeds the threshold, an effect file is generated at step 66, for example of the type shown in FIG. 5. This file is then stored in an appropriate location, and the effect is displayed in the browser at step 68. Although not shown in the flowchart, prior to generating the file at step 66 the process may first determine whether a file for that effect and set of parameter values has already been created and is stored at the location. If so, a new file is not created, to avoid duplication. The process then proceeds to step 64, to analyze the next effect in the project file.

After all of the effects in a project file have been analyzed, the determination at step 64 will be negative. In that case, the process proceeds to step 70 to assess whether there are any further project files to be analyzed. If so, it returns to step 42 to select the next file. If not, the process ends at step 50.

It will be appreciated that, over time, a significant number of effects can be incorporated into the browser, either manually and/or automatically. To facilitate user navigation of the stored effects, they can be grouped into different categories. Referring again to FIG. 4, the left side of the browser contains a listing of different categories into which the effects can be grouped, for ease of navigation by the user. In addition to those illustrated in the figure, other groupings are possible. For example, the effects could be categorized by the storage medium and/or folder in which they are located, those that were most recently created, and/or the time or location of their creation. Other possibilities are to group the effects by common parameters, by project, and/or by a time period, such as all effects used over the previous month. In yet another embodiment, the categories could allow the user to distinguish between those effects that were manually added and those that were automatically populated into the browser.

Figure 8A:
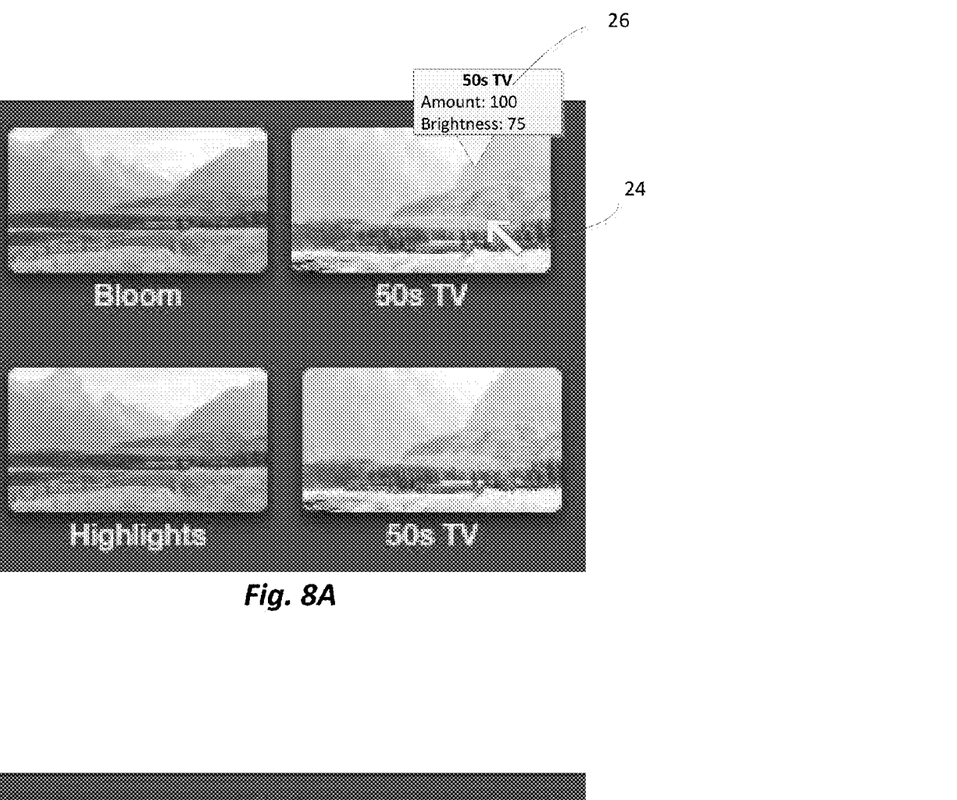
FIGS. 8A and 8B are illustrations of the browser with effect parameter notifications.
Figure 8B:
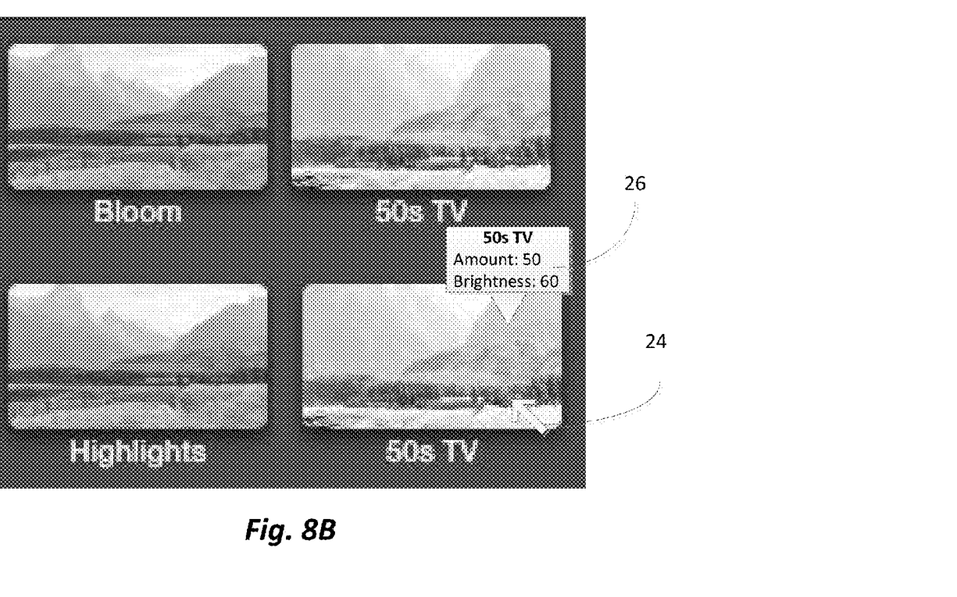

As depicted in FIG. 4, the browser can contain multiple instances of the same effect. In this case, the browser contains two instances of the "50s TV" effect. This situation may occur when the user has one set of desired parameters for an effect in certain types of scenes, and another desired set of parameter values for the same effect in other types of scenes. Thus, the two different instances of the same effect represent two different sets of parameter values for that effect. To enable the user to distinguish between the two items of information appearing in the browser, the particular parameter setting associated with each item can be displayed in response to a user input. For example, with reference to FIGS. 8A and 8B, if the user positions a cursor over one of the items and hovers momentarily, an information box containing the parameter settings can be displayed. Thus, when the cursor 24 is positioned over one of the "50s TV" icons, the parameter values associated with that instance of the effect are displayed in the box 26, as shown in FIG. 8A. By moving the cursor to the adjacent instance of that effect, a different set of parameter values is displayed, as shown in FIG. 8B. Based on this information, the user can choose the appropriate one of the two items for that effect to apply in a given situation.

The display of parameter values in response to a user action is not limited to effects having multiple instances in the browser. Rather, it can be used with every effect that appears in the browser, regardless of the number of instances of that effect. In a touch-screen environment, a single tap of an information icon may cause the parameter setting information 26 to appear, and a double tap can select that effect for application to the video clip that is currently being edited.

As an alternative, or in addition, the user may have the ability to edit the name of the effect as it appears in the browser. For instance, one of the effects shown in FIGS. 8A and 8B can be labeled "50s TV Bright", and the other could be labeled "50s TV Dim."

As a further feature, if a user changes a parameter of an effect that is stored in the browser, he or she can elect to have that change retroactively applied to all instances of the effect in the video sequence. Thus, for example, if the user changes a word in a title, by selecting an appropriate button (not shown) in the effect input box, that change can be automatically applied to each instance of the title in the video sequence, e.g., by using a search and replace function. As a further option, the user may have the ability to apply that same change to other video projects which employ that effect, in addition to the one that is currently being edited.

From the foregoing, it can be seen that the disclosed browser provides a convenient mechanism for a user to repeatedly apply an effect, with the same parameter settings, to multiple video clips, or other types of media content. By saving the parameter settings for an effect in a browser, those settings can be easily selected by the user and applied as desired to the media content within a project. Moreover, the saved effect settings are persistent, and can therefore be employed across multiple media editing projects. The ability to automatically populate the browser with frequently used sets of settings further enhances the user's experience, since it relieves the user of having to search for a particular set of settings among multiple media editing projects.

It will be appreciated by those of ordinary skill in the art that the disclosed media editing user interface can be embodied in other specific forms, without departing from the spirit or essential characteristics thereof. As noted previously, in addition to the described video editing application, it can be used in conjunction with photo editing, audio editing, music creation, 3-D modeling, and other media manipulation projects. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A media editing system, comprising:
   a display device;
   memory for storing data pertaining to at least one media project, the data including at least one parameter value of an effect that is applied to content of the media project; and
   a processor that is configured to perform the following operations:
   display a user interface on said display device, the user interface including a browser that presents items of information representing effects that a user can select to incorporate into a media project,
   search media projects stored in the memory to identify effects having a use value exceeding a predetermined threshold, wherein each effect includes effect parameter values defining the effect, and
   automatically include an item of information in the browser for each identified effect having the use value that exceeds the predetermined threshold.

2. The media editing system of claim 1, wherein the browser further contains media items that can be selected by a user for incorporation in a media project.

3. The media editing system of claim 1, wherein the user interface enables a user to manually designate a set of effect parameter values for addition to the browser, and the processor is configured to respond to such a designation and include an item of information in the browser for the designated effect parameter values.

4. The media editing system of claim 1, wherein the browser is configured to store multiple instances of an effect, each having a different respective set of parameter values.

5. The media editing system of claim 4, wherein the processor is responsive to a user action directed to an item of information in the browser to display the parameter values associated with that item of information.

6. The media editing system of claim 1, wherein the processor is responsive to a change of an effect parameter value for an item of information contained in the browser, and configured to automatically change instances of that effect parameter in a media project.

7. The media editing system of claim 1, wherein the system is a video editing system, and the media content comprises a video clip.

8. A method for providing repeatable effects in a media editing application, comprising:
   displaying a user interface on a display device, the user interface including a browser that presents items of information representing effects that a user can select to incorporate into a media project;
   searching media projects stored in a memory to identify effects having a use value exceeding a predetermined threshold, wherein each effect includes effect parameter values defining the effect, and
   automatically including an item of information in the browser for each identified effect having the use value that exceeds the predetermined threshold.

9. The method of claim 8, further including:
   detecting user selection of an item of information in the browser that pertains to an effect having parameter values; and
   in response to such detection, applying the selected effect and its associated parameter values to media content.

10. The method of claim 9, wherein the browser further contains media items that can be selected by a user for incorporation in a media project.

11. The method of claim 8, further including:
    detecting user designation of a set of effect parameter values for addition to the browser; and
    in response to such a designation, including an item of information in the browser for the designated effect parameter values.

12. The method of claim 8, further including, in response to a user action directed to an item of information in the browser, displaying the effect parameter values associated with that item of information.

13. The method of claim 8, further including, in response to a change of an effect parameter value for an item of information contained in the browser, automatically changing instances of that effect parameter in a media project.

14. The method of claim 8, wherein the media editing application is a video editing application, and the media project comprises a video sequence.

15. A non-transitory computer-readable medium having stored thereon program instructions which, when executed by a processor, cause the processor to perform the following operations:
    display a user interface on a display device, the user interface including a browser that presents items of information representing effects that a user can select to incorporate into a media project;
    search media projects stored in a memory to identify effects having a use value exceeding a predetermined threshold, wherein each effect includes effect parameter values defining the effect, and
    automatically include an item of information in the browser for each identified effect having the use value that exceeds the predetermined threshold.

16. The non-transitory computer-readable medium of claim 15, further including:
    detecting user selection of an item of information in the browser that pertains to effect parameter values; and
    in response to such detection, applying the selected effect and its associated parameter values to media content.

17. The non-transitory computer-readable medium of claim 15, wherein the program instructions further cause the processor to:
    detect user designation of a set of effect parameter values for addition to the browser; and
    in response to such a designation, include an item of information in the browser for the designated effect parameter values.

18. The non-transitory computer-readable medium of claim 15, wherein the program instructions further cause the processor, in response to a user action directed to an item of information in the browser, to display the effect parameter values associated with that item of information.

19. The non-transitory computer-readable medium of claim 15, wherein the program instructions further cause the processor, in response to a change of an effect parameter value for an item of information contained in the browser, to automatically change instances of that effect parameter in a media project.

* * * * *